(12) United States Patent
Bates et al.

(10) Patent No.: US 8,578,335 B2
(45) Date of Patent: Nov. 5, 2013

(54) APPARATUS AND METHOD TO REPAIR AN ERROR CONDITION IN A DEVICE COMPRISING A COMPUTER READABLE MEDIUM COMPRISING COMPUTER READABLE CODE

(75) Inventors: Allen Keith Bates, Tucson, AZ (US); Octaviano G. Gomez, Tucson, AZ (US); Shinobu Wada, Hachioji (JP); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1559 days.

(21) Appl. No.: 11/643,534

(22) Filed: Dec. 20, 2006

(65) Prior Publication Data

US 2008/0155360 A1    Jun. 26, 2008

(51) Int. Cl.
*G06F 9/44*    (2006.01)

(52) U.S. Cl.
USPC ............ 717/124; 717/101; 717/126; 717/127

(58) Field of Classification Search
None
See application file for complete search history.

(56) References Cited

U.S. PATENT DOCUMENTS

| | | | | |
|---|---|---|---|---|
| 6,230,284 | B1* | 5/2001 | Lillevold | 714/13 |
| 6,553,507 | B1* | 4/2003 | Cohen | 714/4 |
| 6,629,267 | B1* | 9/2003 | Glerum et al. | 714/38 |
| 7,017,071 | B2* | 3/2006 | Katayama et al. | 714/4.4 |
| 7,058,860 | B2* | 6/2006 | Miller et al. | 714/47 |
| 7,293,201 | B2* | 11/2007 | Ansari | 714/38 |
| 7,458,064 | B2* | 11/2008 | Potts et al. | 717/124 |
| 7,478,367 | B2* | 1/2009 | Morgan et al. | 717/124 |
| 7,614,043 | B2* | 11/2009 | Ognev et al. | 717/126 |
| 7,644,393 | B2* | 1/2010 | Glerum et al. | 717/127 |
| 8,001,530 | B2* | 8/2011 | Shitrit | 717/124 |
| 2002/0184568 | A1* | 12/2002 | Kurrasch | 714/39 |
| 2002/0194582 | A1 | 12/2002 | Torii et al. | |
| 2004/0003266 | A1* | 1/2004 | Moshir et al. | 713/191 |
| 2005/0125650 | A1 | 6/2005 | Chen et al. | |
| 2006/0095903 | A1 | 5/2006 | Cheam et al. | |
| 2007/0011659 | A1* | 1/2007 | Venolia | 717/127 |
| 2007/0074149 | A1* | 3/2007 | Ognev et al. | 717/101 |

OTHER PUBLICATIONS

Bell et al., Looking for bugs in all the right places, Jul. 2006, 11 pages.*
N. Schneidewind, Investigation of the Risk to Software Reliability and Maintainability of Requirements Changes, Nov. 2001, 10 pages.*

* cited by examiner

*Primary Examiner* — Thuy Dao
(74) *Attorney, Agent, or Firm* — Dale F. Regelman; Quarles & Brady LLP

(57) ABSTRACT

An apparatus and method are disclosed to detect and repair an error condition in a device comprising a computer readable medium comprising computer readable code. The method supplies an engineering server comprising a configuration control database in communication with a product failure alert assembly. The method then interconnects the product failure alert assembly with a product comprising a computer readable medium comprising computer readable code. The method provides product failure information to the engineering server, identifies one or more error conditions, identifies one or more fault symptom codes, determines if the configuration control database comprises one or more code updates associated with those one or more fault symptom codes, and installs those one or more code updates on the product.

14 Claims, 3 Drawing Sheets

APPARATUS AND METHOD TO REPAIR AN ERROR CONDITION IN A DEVICE COMPRISING A COMPUTER READABLE MEDIUM COMPRISING COMPUTER READABLE CODE

FIELD OF THE INVENTION

This invention relates to an apparatus and method to repair an error condition in a device comprising a computer readable medium comprising computer readable code.

BACKGROUND OF THE INVENTION

As a general matter, computing devices comprise a computer readable medium comprising computer readable code disposed therein. Such computing device can from time to time exhibit an error condition. Mitigation of that error condition oftentimes requires a code update and/or code repair.

SUMMARY OF THE INVENTION

What is needed is an apparatus and method to provide automated repair and billing for the repair of such a computing device. What is also needed is an apparatus and method that reduces the amount of time a product application engineer allocates to solving known error conditions by installing known code updates and/or code repairs.

Applicants' invention comprises an apparatus and method to repair an error condition in a device comprising a computer readable medium comprising computer readable code. Applicants' method may be used to test, qualify and repair, a computing device during manufacture. In addition, Applicants' method may be used by a manufacturer to offer extended warranty services to purchasers. Moreover, Applicants' method may be used by a maintenance and repair facility to offer repair services to customers.

Applicants' method supplies an engineering server in communication with a configuration control database, and a product failure alert assembly, where that product failure alert assembly is in communication with the engineering server. The method then interconnects the product failure alert assembly with a product comprising a computer readable medium comprising computer readable code.

In the event Applicants' product failure alert assembly detects an error condition in the product, the method provides product failure information to the engineering server, identifies one or more error conditions using that product failure information, identifies one or more fault symptom codes associated with those one or more error conditions, determines if the configuration control database comprises one or more code updates associated with those one or more fault symptom codes. If Applicants' method determines that the configuration control database comprises one or more code updates associated with the one or more fault symptom codes, then the method provides the one or more code updates to Applicants' product failure alert assembly, and installs those one or more code updates on the product.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
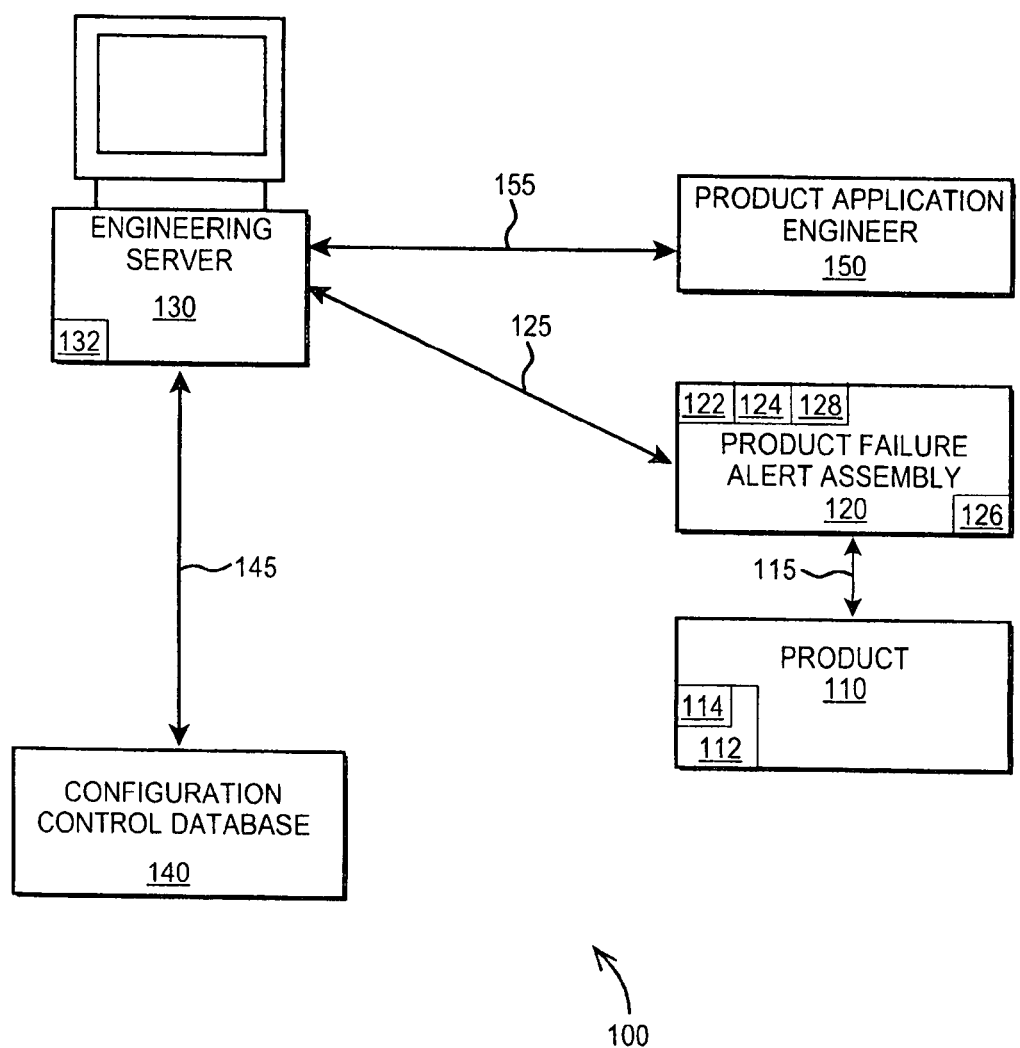
FIG. 1 is a block diagram showing the elements of Applicants' apparatus.

Applicants' invention comprises a method to identify and repair one or more error conditions in a device comprising a computer readable medium comprising computer readable code. FIG. 1 shows the elements of Applicants' product failure alert system 100. In the illustrated embodiment of FIG. 1, product 110 comprises a computing device product comprising a computer readable medium 112 comprising computer readable code 114. In certain embodiments, product 110 is disposed in a manufacturing facility and is being tested as part of the manufacturing Quality Assurance/Quality Control ("QA/QC") protocol. In certain embodiments, product 110 has been sold, and is being used by a purchaser.

Product 110 is interconnected via I/O interface 115 with product failure alert assembly 120. In the illustrated embodiment of FIG. 1, product failure alert assembly 120 comprises memory 122, microcode 124 written to memory 122, and a processor 126. Processor 126 utilizes microcode 124 to operate product failure alert assembly 120.

Product failure alert assembly 120 is in communication with engineering server 130 via I/O interface 125. I/O interfaces 115 and 125 may comprise any data input/output ("I/O") hardware, software, firmware, and/or protocol, such as and without limitation Small Computer Systems Interface ("SCSI") protocol running over a Fibre Channel ("FC") physical layer, Infiniband, Ethernet, Internet SCSI ("iSCSI"), a Bluetooth wireless communication protocol, a radio frequency identification ("RFID") wireless communication protocol, and the like.

Engineering server 130 comprises database/lookup table 132. As a general matter, engineering server 130 comprises a computing device such as a mainframe computer, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

In the illustrated embodiment of FIG. 1, engineering server 130 is in communication with configuration control database 140 via I/O interface 145. I/O interfaces 115 and 125 may comprise any data input/output ("I/O") hardware, software, firmware, and/or protocol, such as and without limitation Small Computer Systems Interface ("SCSI") protocol running over a Fibre Channel ("FC") physical layer, Infiniband, Ethernet, Internet SCSI ("iSCSI"), and the like.

In certain embodiments, configuration control database 140 is integral with engineering server 130. In certain of these embodiments, database/lookup table 132 comprises a portion of configuration control database 140. In other embodiments, configuration control database 140 is external to engineering server 130. In these external embodiments, configuration control database 140 is disposed in second computing device, wherein that second computing device communicates with engineering server 130 via I/O interface 145. I/O interface 145 may comprise any data input/output ("I/O") hardware, software, firmware, and/or protocol, such as and without limitation Small Computer Systems Interface ("SCSI") protocol running over a Fibre Channel ("FC") physical layer, Infiniband, Ethernet, Internet SCSI ("iSCSI"), and the like.

Engineering server 130 is in communication with a product application engineer 150 via I/O interface 155. In certain embodiments, product application engineer 150 communicates with engineering server 130 via a third computing device, wherein that third computing device is interconnected with engineering server 130 via I/O interface 155. I/O interface 155 may comprise any data input/output ("I/O") hardware, software, firmware, and/or protocol, such as and without limitation Small Computer Systems Interface ("SCSI") protocol running over a Fibre Channel ("FC") physical layer, Infiniband, Ethernet, Internet SCSI ("iSCSI"), and the like.

In certain embodiments, product 110 and Applicants' product failure alert assembly 120 are disposed at a first location. Applicants' engineering server is disposed at a second location, where that second location differs from the first location. Applicants' configuration control database 140 is disposed at a third location, where that third location differs from both the second location and the first location. Product application engineer 150 is disposed at a fourth location, where that fourth location differs from each of the third location, the second location, and the first location. By "location," Applicants' mean a structure such as for example a manufacturing plant, a warehouse, an office, and the like.

Figure 2:
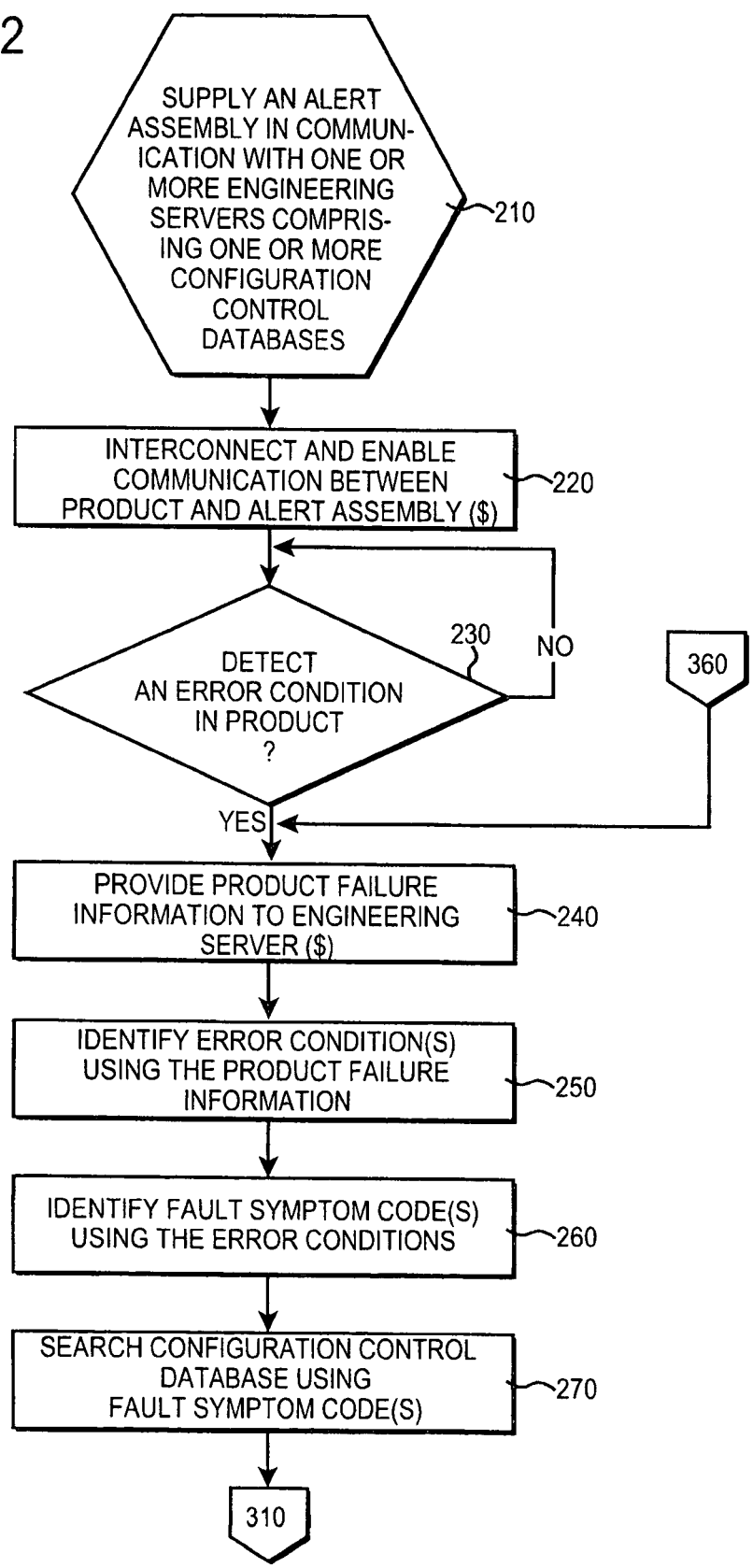
FIG. 2 is a flow chart summarizing certain steps of Applicants' method.
Figure 3:
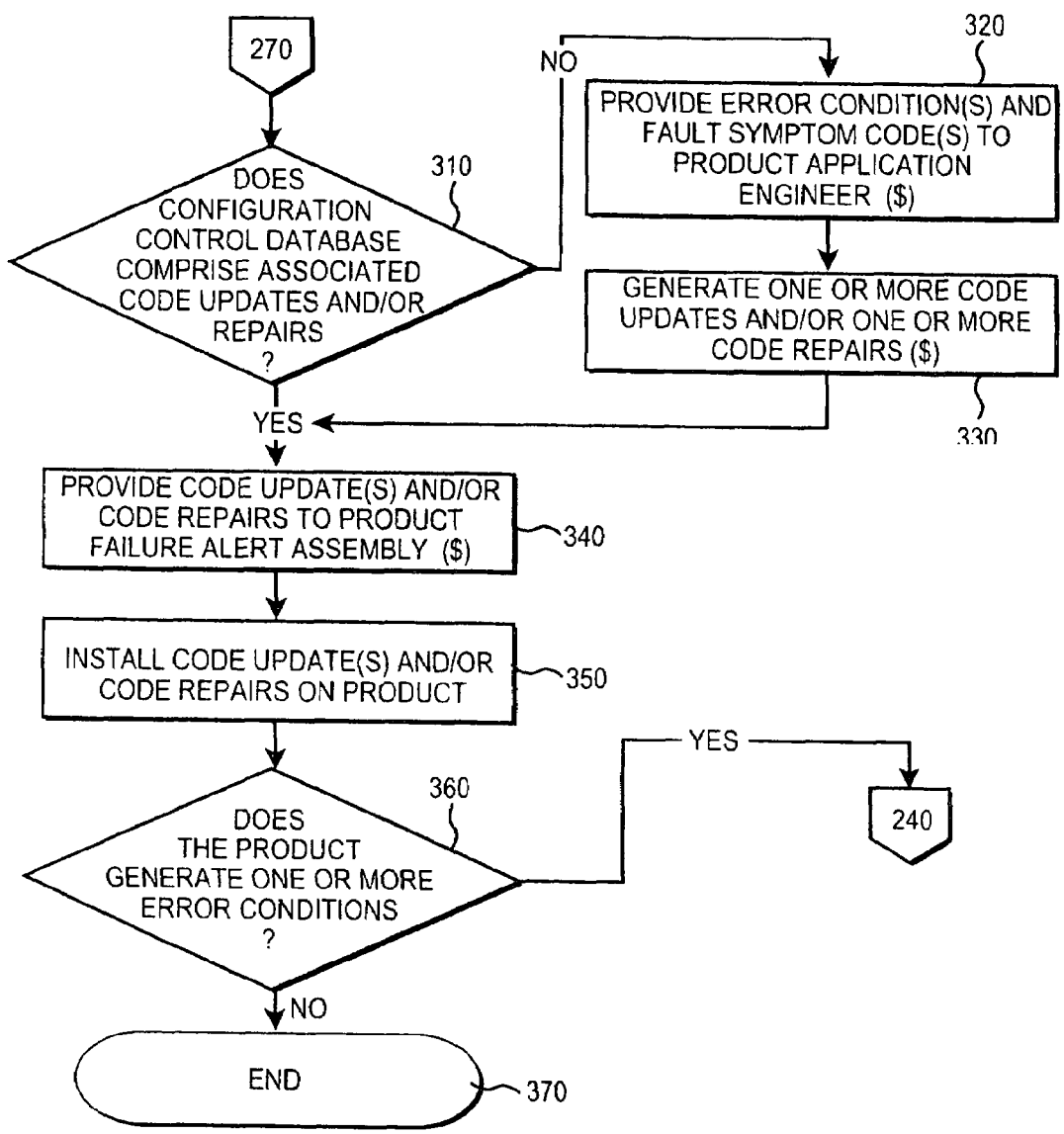
FIG. 3 is a flow chart summarizing additional steps of Applicants' method.

FIGS. 2 and 3 summarize the steps of Applicants' method. Applicants' method may be used to test, qualify, and/or repair, a computing device during manufacture. In addition, Applicants' method may be used by a manufacturer to offer extended warranty services to purchasers. Moreover, Applicants' method may be used by a maintenance and repair facility to offer repair services to customers.

Referring now to FIG. 2, in step 210 Applicants' method supplies a product failure alert assembly, such as Applicants' product failure alert assembly 120 (FIG. 1), wherein that product failure alert assembly is in communication with an engineering server, such as for example and without limitation Applicants' engineering server 130 (FIG. 1), wherein that engineering server is in communication with a configuration control database, such as Applicants' configuration control database 140 (FIG. 1).

In step 220, Applicants' method provides a product comprising a computer readable medium comprising computer readable code, and interconnects and enables communication between the product failure alert assembly of step 210 and the product.

In certain embodiments, the product of step 220 is disposed in a manufacturing facility and is being tested as part of the manufacturing Quality Assurance/Quality Control ("QA/QC") protocol. In other embodiments, the product of step 210 has been sold, and is being used by a purchaser.

In certain embodiments, the product manufacturer owns and/or operates the product failure alert assembly of step 210, and/or the engineering server of step 210, and/or the configuration control database of step 210. In other embodiments, a product service and maintenance facility other than the product manufacturer owns and/or operates the product failure alert assembly of step 210, and/or the engineering server of step 210, and/or the configuration control database of step 210. In certain embodiments, the product manufacturer and/or product service and maintenance facility charges the customer a first fee for performing step 220.

In step 230, the product failure alert assembly of step 210 continuously monitors the status of the interconnected product. If that product failure alert assembly detects an error condition, then Applicants' method transitions from step 230 to step 240 wherein the product failure alert assembly provides product failure information to the engineering server of step 210. In certain embodiments, the product manufacturer and/or product service and maintenance facility charges the customer a second fee for performing step 240.

In step 250, Applicants' engineering server 130, using database/lookup table 132 (FIG. 1), identifies one or more error conditions associated with the product failure information. In step 260, Applicants' engineering server 130 (FIG. 1), using database/lookup table 132 (FIG. 1), identifies one or more fault symptom codes associated with the one or more error conditions of step 250.

In step 270, Applicants' engineering server 130 (FIG. 1) searches the configuration control database of step 210 for one or more code updates and/or code repairs (collectively "code updates") associated with the one or more one or more fault symptom codes of step 260. Applicants' method transitions from step 270 to step 310 (FIG. 3).

Referring now to FIG. 3, in step 310 Applicants' engineering server 130 (FIG. 1) determines if the configuration control database comprises one or more code updates associated with the one or more one or more fault symptom codes of step 260. If Applicants' method determines in step 310 that the configuration control database comprises one or more code updates associated with the one or more one or more fault symptom codes, then the method transitions from step 310 to step 340 wherein Applicants' engineering server 130 (FIG. 1) provides those one or more code updates to the product failure alert assembly of step 210. In certain embodiments, the product manufacturer and/or product service and maintenance facility charges the customer a third fee for performing step 340.

Applicants' method transitions from step 340 to step 350 wherein Applicants' product failure alert assembly 120 installs the code update(s) on the interconnected product. In step 360, Applicants' method determines if the product continues to generate one or more error conditions. In certain embodiments, step 360 comprises running by processor 126 (FIG. 1) one or more test algorithms 128 stored in memory 124 (FIG. 1) of product failure alert assembly 120 (FIG. 1). Based upon the results of executing those one or more test algorithms, Applicants' product failure alert assembly 120 (FIG. 1) determines if the product continues to generate one or more error conditions.

If Applicants' method determines in step 360 that the installed code updates eliminated the error conditions previously identified, then Applicants' method transitions from step 360 to step 370 and ends. Alternatively, if Applicants' method determines in step 360 that the installed code updates did not eliminate the error conditions previously identified, then Applicants' method transitions from step 360 to step 240 (FIG. 2) and continues as described herein.

If Applicants' method determines in step 310 that the configuration database does not comprise one or more code updates associated with the one or more one or more fault symptom codes, then the method transitions from step 310 to step 320 wherein Applicants' engineering server provides the one or more error conditions of step 250 (FIG. 2) and the one or more fault symptom codes of step 260 (FIG. 2), to a product application engineer for review. In certain embodiments, the product manufacturer and/or product service and maintenance facility charges the customer a fourth fee for performing step 320.

Applicants' method transitions from step 320 to step 330 wherein the product application engineer generates one or more code updates and/or code repairs to mitigate the one or more error conditions of step 250 (FIG. 2) and the one or more fault symptom codes of step 260 (FIG. 2). In certain embodiments, the product manufacturer and/or product service and maintenance facility charges the customer a fifth fee for performing step 330.

Applicants' method transitions from step 330 to step 340 wherein Applicants' method provides the one or more code updates and/or one or more code repairs of step 330 to Applicants' product failure alert assembly 120 (FIG. 1). Applicants' method transitions from step 340 to step 350 and continues as described herein.

In certain embodiments, individual steps recited in FIG. 2 and/or in FIG. 3 may be combined, eliminated, or reordered.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to provide warranty services by the manufacturer of a product comprising a computer readable medium comprising computer readable code, comprising:
   supplying an engineering server external to said product and comprising a database associating product failure information with known error conditions and with fault symptom codes;
   supplying a product failure alert assembly external to said product and comprising memory, microcode written to said memory, one or more test algorithms written to said memory, and a processor, wherein said product failure alert assembly is in communication with said product;
   supplying a computing device external to said engineering server, and external to said product failure alert device, and external to said product, wherein said computing device comprises a configuration control database, wherein said configuration control database comprises one or more code updates associated with said one or more fault symptom codes;
   supplying, a first communication link interconnecting said product and said product failure alert assembly, a second communication link interconnecting said product failure alert assembly and said engineering server, wherein said first communication link differs from said second communication link, a third communication link interconnecting said engineering server with said configuration control database wherein said third communication link differs from said first communication link and said second communications link, and a fourth communication link interconnecting said engineering server with a product application engineer, wherein said four communication link differs from said first communication link, and said second communication link, and said third communication link;
   detecting an error condition in said product;
   providing product failure information to said engineering server by said product failure alert assembly;
   identifying one or more error conditions using said product failure information;
   identifying one or more fault symptom codes associated with said one or more error conditions;
   determining if said configuration control database comprises one or more code updates associated with said one or more fault symptom codes;
   operative if said configuration control database comprises one or more code updates associated with said one or more fault symptom codes;
   providing said one or more code updates to said product failure alert assembly; and
   installing by said product failure alert assembly said one or more code updates on said product;
   running one or more test algorithms to determine whether the installed one or more code updates eliminate said one or more error conditions; and
   if the installed one or more code updates do not eliminate said one or more error conditions, then continue to perform the steps of providing, identifying, installing to provide one or more other code updates that eliminate said one or more error conditions.

2. The method of claim 1, further comprising the steps of:
   operative if said configuration control database does not comprise one or more code updates associated with said one or more fault symptom codes, providing by said engineering server said one or more one or more fault symptom codes to said product application engineer;
   generating one or more code updates by said product application engineer;
   providing said code updates to said product failure alert assembly; and
   installing said one or more code updates on said product.

3. The method of claim 2, wherein:
   said product is owned by a purchaser;
   said interconnecting step further comprises charging said purchaser a first fee;
   said providing product failure information step further comprises charging said purchaser a second fee; and
   said providing said one or more code updates step further comprises charging said purchaser a third fee.

4. The method of claim 3, wherein said providing said one or more fault symptom codes to said product application engineer step further comprises charging said purchaser a fourth fee.

5. The method of claim 4, wherein said generating one or more code updates step further comprises charging said purchaser a fifth fee.

6. A method to provide repair services for a product comprising a computer readable medium comprising computer readable code, comprising:
   supplying an engineering server external to said product and comprising a database associating product failure information with known error conditions and with fault symptom codes;

supplying a product failure alert assembly external to said product and comprising memory, microcode written to said memory, one or more test algorithms written to said memory, and a processor, wherein said product failure alert assembly is in communication with said product;

supplying a computing device external to said engineering server, and external to said product failure alert device, and external to said product, wherein said computing device comprises a configuration control database, wherein said configuration control database comprises one or more code updates associated with said one or more fault symptom codes;

detecting an error condition in said product;

providing product failure information to said engineering server by said product failure alert assembly;

identifying one or more error conditions using said product failure information;

identifying one or more fault symptom codes associated with said one or more error conditions;

determining if said configuration control database comprises one or more code updates associated with said one or more fault symptom codes;

operative if said configuration control database comprises one or more code updates associated with said one or more fault symptom codes;

providing said one or more code updates to said product failure alert assembly; and installing by said product failure alert assembly said one or more code updates on said product;

running one or more test algorithms to determine whether the installed one or more code updates eliminate said one or more error conditions; and if the installed one or more code updates do not eliminate said one or more error conditions, then continue to perform the steps of providing, identifying, installing to provide one or more other code updates that eliminate said one or more error conditions.

7. The method of claim 6, further comprising:
operative if said configuration control database does not comprise one or more code updates associated with said one or more fault symptom codes, providing by said engineering server said one or more one or more fault symptom codes to a said product application engineer;
generating one or more code updates by said product application engineer.

8. The method of claim 7, wherein:
said product is owned by a repair services customer; and
said interconnecting step further comprises charging said repair services customer a first fee.

9. The method of claim 8, wherein said providing product failure information step further comprises charging said repair services customer a second fee.

10. The method of claim 9, wherein said providing said one or more code updates step further comprises charging said repair services customer a third fee.

11. The method of claim 10, wherein said providing said one or more fault symptom codes to said product application engineer step further comprises charging said repair services customer a fourth fee.

12. The method of claim 11, wherein said generating one or more code updates step further comprises charging said repair services customer a fifth fee.

13. A method to manufacture a product comprising a computer readable medium comprising computer readable code, comprising the steps of:

supplying an engineering server external to said product and comprising a database associating product failure information with known error conditions and with fault symptom codes;

supplying a product failure alert assembly external to said product and comprising memory, microcode written to said memory, one or more test algorithms written to said memory, and a processor, wherein said product failure alert assembly is in communication with said product;

supplying a computing device external to said engineering server, and external to said product failure alert device, and external to said product, wherein said computing device comprises a configuration control database, wherein said configuration control database comprises one or more code updates associated with said one or more fault symptom codes;

detecting an error condition in said product;

providing product failure information to said engineering server by said product failure alert assembly;

identifying one or more error conditions using said product failure information;

identifying one or more fault symptom codes associated with said one or more error conditions;

determining if said configuration control database comprises one or more code updates associated with said one or more fault symptom codes;

operative if said configuration control database comprises one or more code updates associated with said one or more fault symptom codes;

providing said one or more code updates to said product failure alert assembly; and installing by said product failure alert assembly said one or more code updates on said product;

running one or more test algorithms to determine whether the installed one or more code updates eliminate said one or more error conditions; and if the installed one or more code updates do not eliminate said one or more error conditions, then continue to perform the steps of providing, identifying, installing to provide one or more other code updates that eliminate said one or more error conditions.

14. The method of claim 13, further comprising:
operative if said configuration control database does not comprise one or more code updates associated with said one or more fault symptom codes, providing by said engineering server said one or more one or more fault symptom codes to said product application engineer;
generating one or more code updates by said product application engineer.

* * * * *